Jan. 5, 1943.   F. T. HARRINGTON ET AL   2,307,585

POWER TRANSMISSION

Filed July 13, 1939   2 Sheets-Sheet 1

INVENTORS
FERRIS T. HARRINGTON &
KAMILL SEIDEL
BY
*Ralph L. Tweedale*
ATTORNEY

Patented Jan. 5, 1943

2,307,585

UNITED STATES PATENT OFFICE 2,307,585

POWER TRANSMISSION

Ferris T. Harrington and Kamill Seidel, Detroit, Mich., assignors to Vickers Incorporated, Detroit, Mich., a corporation of Michigan Application July 13, 1939, Serial No. 284,207

4 Claims. (Cl. 121—46.5)

This invention relates to power transmissions, particularly to those of the type comprising two or more fluid pressure energy translating devices one of which may function as a pump and another as a fluid motor.

The invention is more particularly concerned with a directional control valve for controlling the flow of fluid between the pump and motor units of such a transmission. Where the motor unit of the transmission has a large volumetric capacity as, for example, in a large hydraulic press, the potential energy stored in this large volume of fluid at high pressure and in the highly stressed tension rods of the press represents a considerable volume of fluid, and its sudden release, as when the usual four-way valve is shifted to release the pressure in the motor, frequently creates intense shock on all parts of the system. The usual spool type of valve customarily employed is so constructed that the high velocity flow within the valve when the pressure begins to be released from the motor sets up complex jet reactions on the spool of the valve which tend to shift the spool even more rapidly than otherwise and thus aggravate the condition.

It is an object of the present invention to provide a valve construction suitable for use with a fluid motor having a large volumetric capacity wherein the release of pressure from the motor as the valve is shifted is made to take place gradually and wherein any jet reactions set up are prevented from acting on the spool to increase its speed of shifting.

A further object is to provide a valve of the character described which by selective interchange of alternative spools may be used in transmission circuits of different characteristics.

Further objects and advantages of the present invention will be apparent from the following description, reference being had to the accompanying drawings wherein a preferred form of the present invention is clearly shown.

Figure 1:
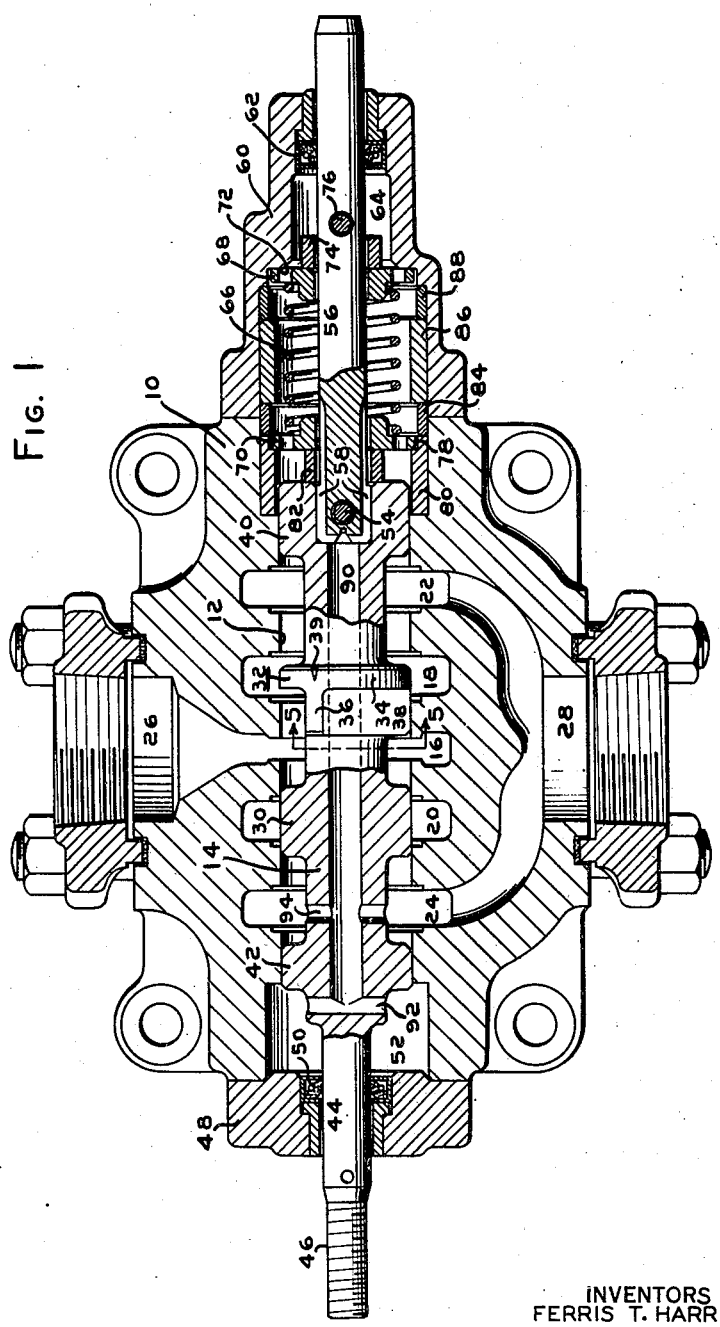
Figure 1 is a longitudinal cross section of a valve embodying a preferred form of the present invention.

Referring now to Figure 1, there is shown a valve comprising a main body member 10 having a longitudinal bore 12 within which a spool 14 is slidably mounted. The bore 12 is provided with a series of annular ports of which 16 may be the pressure port, 18 and 20 the cylinder ports, and 22 and 24 the tank ports. The pressure port communicates with a pressure pipe connection 26 while the two tank ports communicate with a return pipe connection 28. The cylinder ports 18 and 20 communicate with similar cylinder pipe connections, not shown, which may be arranged in the usual fashion.

Figure 5:
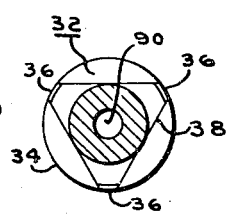
Figure 5 is a cross section taken on line 5—5 of Figure 1.

The spool 14 is provided with a solid land 30 which seals the cylinder port 20 when the spool is in the central position illustrated. A cut-away land 32 is provided which registers with the cylinder port 18 but does not seal the same. The land 32 is constructed with a continuous cylindrical portion 34 and with an interrupted cylindrical portion 36, the interruptions constituting three or more flat cut-outs 38 as shown in Figure 5. In axial alignment with the interrupted cylindrical portion 36 there is provided in the continuous cylindrical portion 34 a series of small V-shaped notches 39 which are so arranged that the apex of the notch is a considerable distance from the nearest edge of the flats 38 while at the same time very close in an axial direction to a plane passing through the left-hand edge of the continuous cylindrical portion 34.

The spool 14 is also provided with two end lands 40 and 42 which lie outwardly of the tank ports 22 and 24 respectively in all positions of the valve. The left-hand end of the spool is reduced in diameter to provide an operating stem 44 having a threaded portion 46 for attachment to a suitable operating lever or other mechanism. An end cap 48 provided with an oil seal 50 surrounds the stem portion 44 and serves to enclose an end chamber 52 in the valve body.

The right-hand end of the spool has secured thereto by a pin 54 a balancing stem 56, the right-hand end of which is provided with grooving 58 forming breather passages. An end cap 60 is secured to the right-hand end of the body and has an oil seal 62 surrounding the stem 56 and serves to enclose an end chamber 64. A centering spring 66 is mounted around the stem 56 between two spring plates 68 and 70 having breather passages therein. The plate 68 abuts against a shoulder 72 in the end cap 60 and also against a spacer washer 74 which is held in place by a pin 76 on the stem 56. The spring plate 70 abuts against a shoulder 78 formed in a spacer washer 80 mounted in the body 10 and also abuts against a spacer washer 82 which is mounted on the stem 56 and rests against the right-hand end of the spool 14. Suitable spacer washers 84, 86 and 88 may be mounted within the end cap 60 for retaining the spacer washer 80 in position.

The spool 14 is formed with a central bore 90 which communicates with the grooves 58 at its right-hand end and with a cross bore 92 at its left-hand end and which opens into the end chamber 52. A cross bore 94 is also formed in the spool at a point intermediate the lands 30 and 42.

In operation of the valve with the spool in the central position illustrated, pressure oil is by-passed to tank by passing from the pressure port 16 across the flats 38 and over the cylindrical portion 34 of land 32 and thence into the port 22. The cylinder port 18 is likewise connected to tank in this position while the cylinder port 20 is blocked. Thus, if the valve be connected to a hydraulic press, the cylinder port 20 would be connected to the push-back cylinder of the press while the port 18 would be connected to the main operating cylinder.

In order to admit oil to the main cylinder the valve spool is shifted to the right sufficiently so that the cylindrical portion 34 of land 32 seals the bore 12 between ports 18 and 22 while the land 30 blocks communication between ports 16 and 20 while opening communication between ports 20 and 24. In this position pressure oil is directed from port 16 to port 18 and oil returns from the cylinder port 20 to the tank port 24.

In order to reverse the connections the valve is shifted fully to the left where the cylindrical portion 34 of land 32 seals the bore between ports 16 and 18, and land 30 seals the bore between ports 20 and 24. In moving to this position it will be noted that as soon as the apices of the notches 39 begin to open to the port 18 that the relief of pressure oil from the main cylinder is begun gradually.

Since the stored energy in the large cylinder is of considerable magnitude there is for an instant a very high velocity jet through the grooves 39. This jet action, however, is confined to the tank port 22 and to the portion of the bore between it and port 18. Since the spool is axially balanced by having equal and oppositely facing areas exposed to this pressure, whatever it may be, the jet reaction is prevented from acting on the spool itself. In other words, the high velocity flow conditions at port 22 are excluded from the end chamber 64 and the chamber containing the spring 66. Thus the valve may shift to reverse position at its normal intended rate independently of the high velocity flow produced at the moment of initial release of cylinder pressure.

The end chambers, however, are connected for free interchange of displaced oil as the spool shifts but the connection has to be through the central bore 90, the grooves 58 and the cross bore 92. The cross bore 94 serves to maintain tank pressure in the end chambers at all times and to drain seepage which may take place along either of the lands 40 or 42.

It will be noted that when the valve is fully shifted either to the right or left that the land 32 provides a substantial seal with the bore 12 in spite of the fact that the notches 39 extend very nearly to the plane of the left-hand end of the cylindrical portion 34. This is due to the location of the notches opposite the interrupted cylindrical portion 36. It is thus possible to provide the initial pressure relieving notches 39 of substantial length without sacrificing the sealing qualities of the land 32 when the valve is in its fully shifted position.

Figure 2:
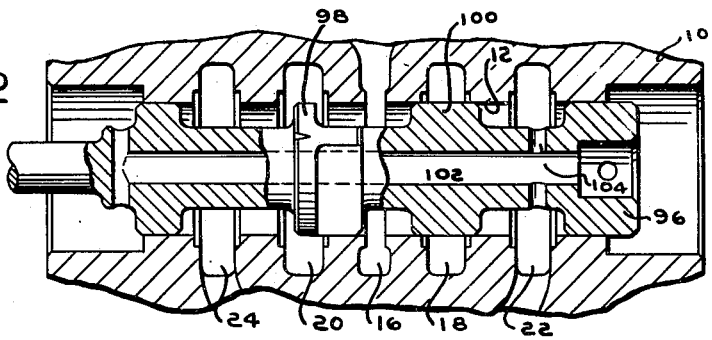
Figure 2 is a fragmentary view corresponding to Figure 1 showing an alternative spool construction.

The desirable advantages of the construction described may be obtained in valves designed for various types of circuits, Figure 2 illustrating a similar construction wherein a modified spool 96 is substituted for the spool 14. This spool may be the same as the spool 14 except that a land 98 is formed like the land 32 of Figure 1 while a land 100 is formed like the land 30. In this case a central bore 102 communicates with a cross bore 104 opposite the right-hand tank port 22. A spool of this character may be used where it is necessary to connect the left-hand cylinder port 20 with the main operating cylinder of a press or other analogous device while the port 18 is connected to the pull-back cylinder.

Figure 3:
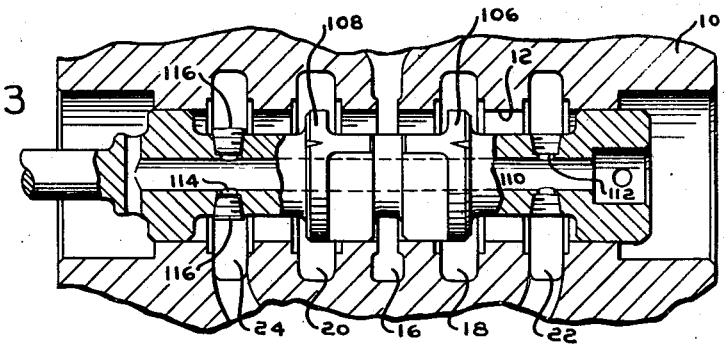
Figure 3 is a fragmentary view corresponding to Figure 1 showing a second alternative spool construction.

Figure 3 illustrates a further modified type of spool in which both lands 106 and 108 are constructed similarly to the land 32 in Figure 1. In this case a central bore 110 is provided with two cross bores 112 and 114 communicating with the tank ports 22 and 24 respectively. These bores are provided with threaded portions for the reception of plugs 116 which in the present instance are shown located in the cross bore 114. This form of spool may be utilized where it is desired to connect both cylinder ports with tank when the spool is in neutral position. With the plugs 116 in the position shown, the cylinder port 20 may be connected to the main operating cylinder. At the time of pressure release from the main cylinder the plugs 116 serve to isolate the high velocity flow from the end chambers of the valve body. If it is desired to connect the port 18 with the main cylinder, the plugs 116 may be removed and placed in the cross bore 112, thus isolating the end chambers under these conditions.

Figure 4:
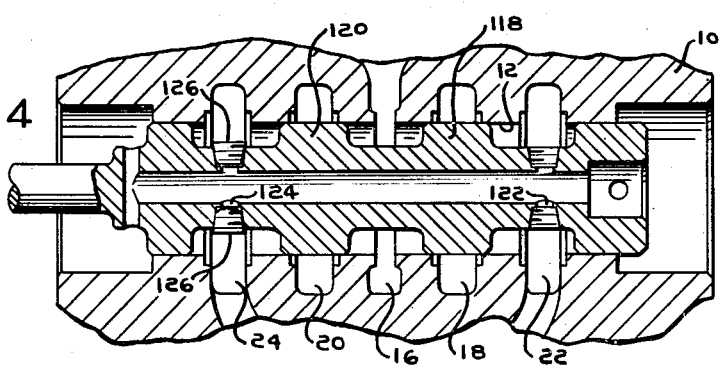
Figure 4 is a fragmentary view corresponding to Figure 1 showing a third alternative spool construction.

Figure 4 illustrates a third modified form of spool in which both lands 118 and 120 are constructed similarly to the land 30 of Figure 1. Cross bores 122 and 124 are similar to the bores 112 and 114 and are provided with interchangeable plugs 126. The difference between this spool and the spool of Figure 3 is in the fact that at neutral position both cylinder ports 18 and 20 are fully blocked, it being necessary to provide additional means for unloading the pump while the spool is in neutral position.

While the form of embodiment of the invention as herein disclosed constitutes a preferred form, it is to be understood that other forms might be adopted, all coming within the scope of the claims which follow.

What is claimed is as follows:

1. A four-way valve of the balanced-spool type including a body with a longitudinal bore provided with a pressure port, cylinder ports on opposite sides of the pressure port, and tank ports adjacent the cylinder ports on the sides away from the pressure port, a four-land spool slidable in the bore, said lands being located so that when the spool is in neutral position two lands lie opposite the cylinder ports and two lands lie outwardly of the tank ports, means forming a passage connecting together the ends of the bore at points outwardly of the last-mentioned lands, means forming a pair of branch passageways leading from said connecting passage, one communicating with each tank port, and means for selectively blocking one or the other of said branch passageways.

2. A four-way valve of the balanced-spool type including a body with a longitudinal bore provided with a pressure port, cylinder ports on opposite sides of the pressure port, and tank ports adjacent the cylinder ports on the sides away from the pressure port, a four-land spool slidable in the bore, said lands being located so that when the spool is in neutral position two lands lie opposite the cylinder ports and two lands lie outwardly of the tank ports, means forming a passage through the spool connecting together the ends of the bore at points outwardly of the last-mentioned lands, means forming a pair of branch passageways leading from said connecting passage, one communicating with each tank port, and means for selectively blocking one or the other of said branch passageways.

3. A directional control valve of the balanced-spool type including a body with a longitudinal bore provided with pressure, cylinder and tank ports, and a spool slidable in the bore and provided with a land adapted to lie opposite the cylinder port when the spool is in neutral position, said land having a cylindrical sealing portion and an interrupted cylindrical non-sealing portion axially adjacent thereto, said sealing portion being provided with a plurality of small tapered axial grooves in its cylindrical surface opening to the side away from the non-sealing portion and axially aligned with the parts of the non-sealing portion where the cylindrical surface thereof is uninterrupted, said bore having a cylindrical sealing surface between ports of greater axial length than the sealing portion of the valve.

4. A four-way reverse valve of the externally-operated, internally-drained type for use with a hydraulic press or the like having a hydraulic cylinder in which a large amount of potential energy is stored during a working stroke by compression of liquid and elastic deformation of machine parts, comprising a body with a longitudinal bore provided with a pressure port, cylinder ports on opposite sides of the pressure port, and tank ports adjacent the cylinder ports on the sides away from the pressure port, a four-land spool slidable in the bore, said lands being located so that when the spool is in neutral position two lands lie opposite the cylinder ports and two lands lie outwardly of the tank ports, and means forming a free passage through the spool connecting together the ends of the bore at points outwardly of the last-mentioned lands, said passageway being isolated from direct communication with the one of said tank ports through which said cylinder is exhausted to release said stored energy, whereby when, at the completion of a working stroke, the spool is shifted to connect a cylinder port with said one tank port, the high pressures and jet reactions temporarily set up in said one tank port are isolated from the ends of the bore and prevented from unbalancing said spool.

FERRIS T. HARRINGTON.
KAMILL SEIDEL.